United States Patent

Nunley

[15] 3,648,664
[45] Mar. 14, 1972

[54] ANIMAL TETHERING APPARATUS AND THE LIKE

[72] Inventor: William M. Nunley, 820 Martin Avenue, Portsmouth, Va. 23701

[22] Filed: July 2, 1970

[21] Appl. No.: 51,987

[52] U.S. Cl. .................................................... 119/120
[51] Int. Cl. .......................................................... A01k 3/00
[58] Field of Search ............................ 119/120, 29; 272/24

[56] References Cited

UNITED STATES PATENTS

| 2,094,018 | 9/1937 | Norton | 119/120 |
| 1,233,649 | 7/1917 | Czaja et al. | 119/120 |
| 1,563,212 | 11/1925 | Madiar | 119/120 |
| 2,500,805 | 3/1950 | Costello | 119/120 X |

Primary Examiner—Hugh R. Chamblee
Attorney—J. Maxwell Carson, Jr.

[57] ABSTRACT

Apparatus including a horizontally disposed line or the like supported a distance above ground or floor level and having two or more angularly related sections, as well as a shuttle device moveable along the length thereof past the support points for the adjoining sections thereof. The shuttle may be in the form of a tubular element substantially encircling the line and having a suitable side slot enabling the same to move past components of a support point, as well as end surfaces shaped to facilitate movement of the shuttle past a support point, and includes a downwardly depending element to which animate or inanimate objects may be secured. Alternatively, the shuttle may include a substantially operationally vertically disposed plate element having a pair of upper rollers and a pair of lower rollers connected to a flat surface thereof substantially embracing the line or the like along the upper and lower extremities thereof; the side extremities of the line or the like being embraced by the plate element and by the spokes of a rowel rotatably carried thereby. The rowel rotates to permit such a shuttle to pass substantially horizontally disposed support lines or the like connected to the line or the like carrying the shuttle.

9 Claims, 14 Drawing Figures

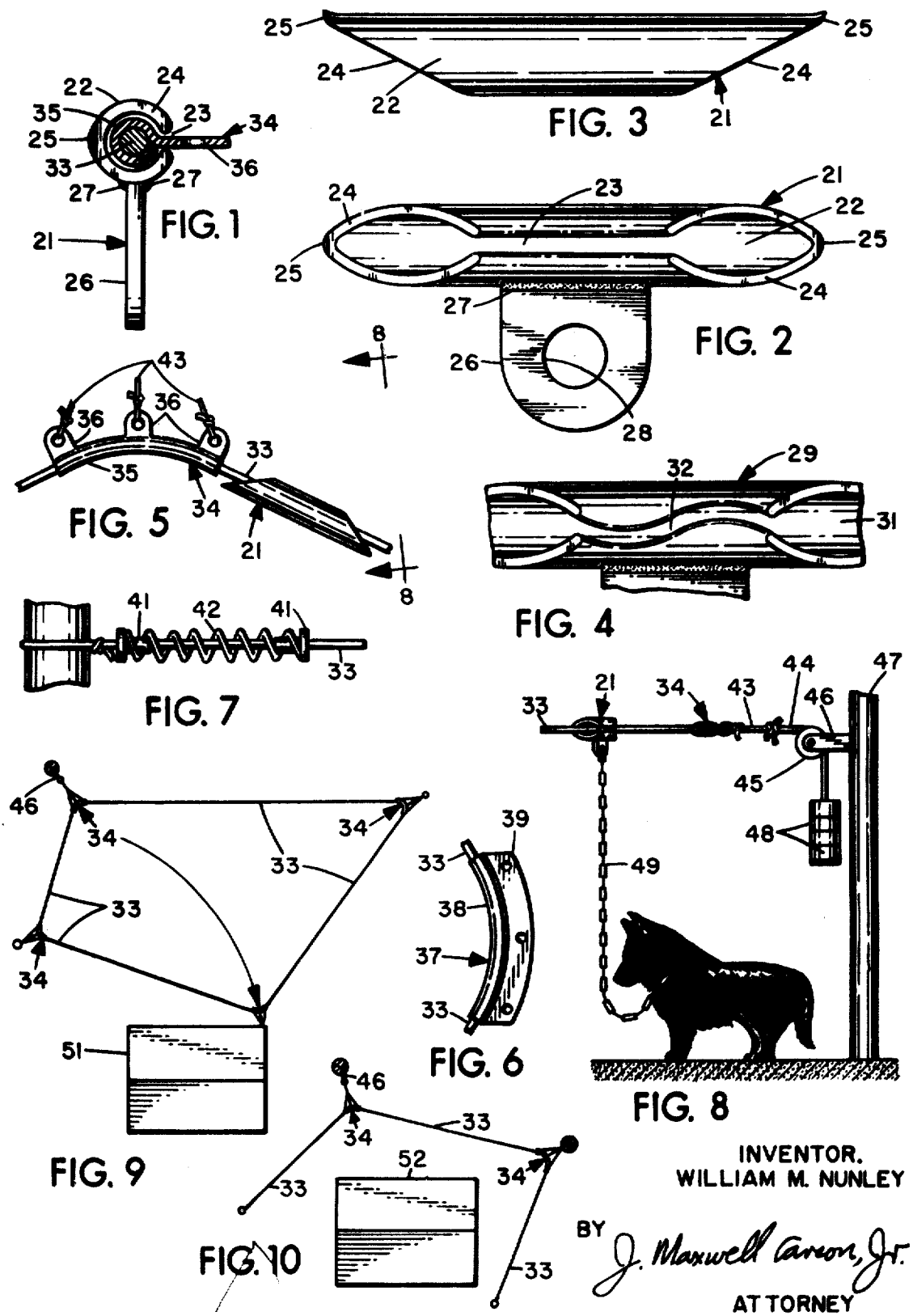

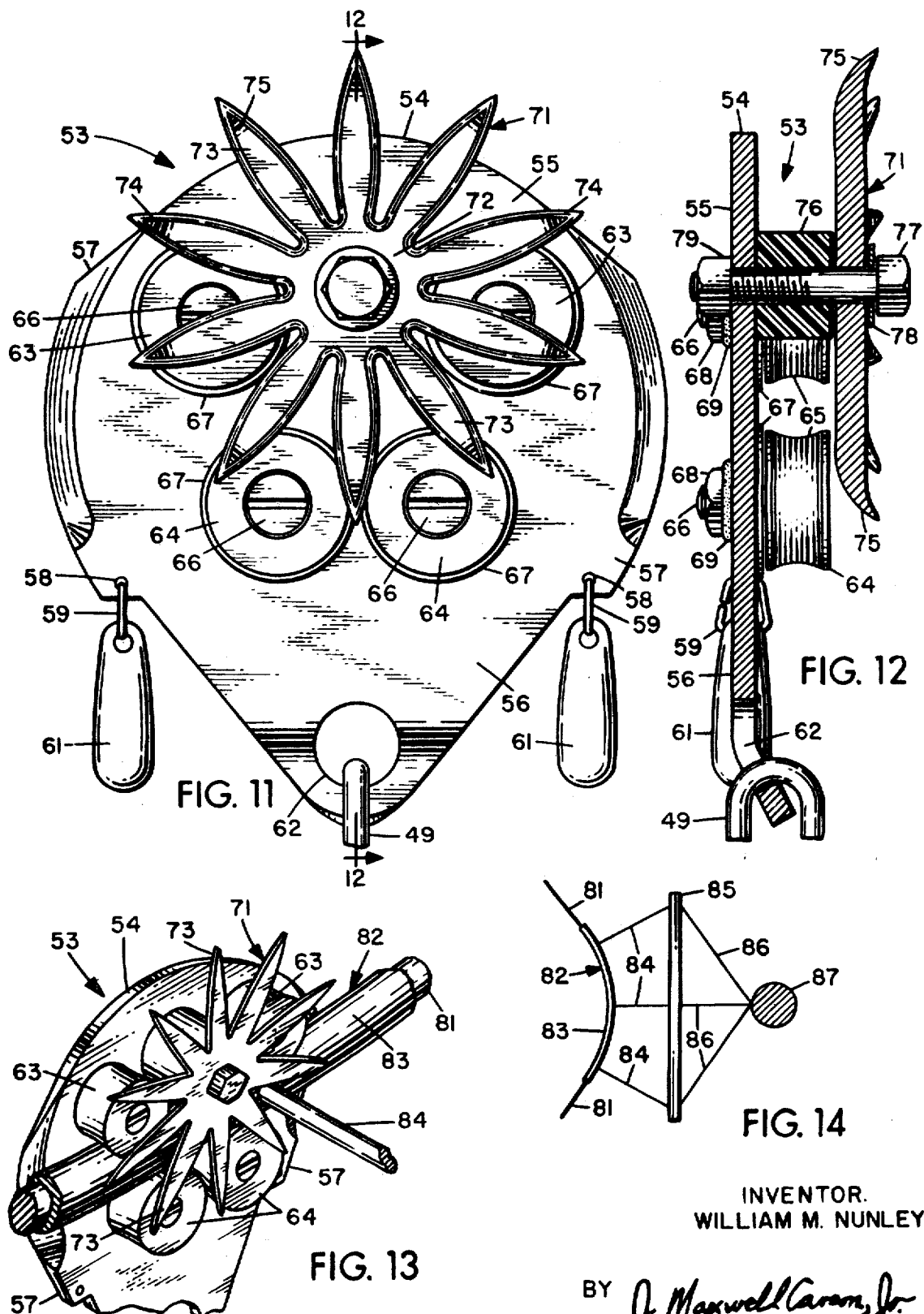

ANIMAL TETHERING APPARATUS AND THE LIKE

This invention relates generally to animal tethering apparatus and the like and is more particularly directed to apparatus of this type including a device freely moveable by an animal or a manually manipulatable inanimate object secured thereto along an overhead line or the like having horizontally angularly related sections.

The owners of dogs and other pet animals who reside in moderately to heavily populated suburban and urban areas are generally prohibited, as a matter of local law, from allowing their pets to roam at large. As a consequence, such persons must either enclose at least a portion of their property with fences adequate to pen in their pets, when it is desired to leave them out of doors without human supervision, or provide a suitable tethering device to which the animal may be secured. Inasmuch as fencing adequate to pen in many dogs and the like may be quite expensive, or even unpermissible under local restrictions regarding the height and type of fencing that a person may erect on his property, many pet owners find it necessary at times to tether their animals to some device suitable for this purpose.

It has long been known that tethered dogs and other animals require a certain amount of freedom of movement in order to obtain the exercise necessary for the maintenance of good physical condition. For this reason, animal tethering apparatus heretofore known has occasionally included a device designed to travel between the end supports of a wire or the like horizontally disposed at a distance above ground level, as shown, for example, in U.S. Pat. No. 274,462 granted to C. F. Christopher et al. on Mar. 27, 1883, and in U.S. Pat. No. 2,953,116 granted to R. W. Lund on Sept. 20, 1960; such devices including a flexible line or chain depending therefrom connectable to a collar or harness worn by an animal. Further, in order to extend the range of movement of a tethered animal over that allowed by the apparatus forming the subject matter of the hereinbefore mentioned prior art patents, animal tethering apparatus also heretofore proposed, as shown in U.S. Pat. No. 1,563,212 granted to J. J. Madiar on Nov. 24, 1925, and U.S. Pat. No. 2,094,018 granted to A. Norton on Sept. 28, 1937, includes a device designed to travel along the entire length of a wire or the like horizontally disposed at a distance above ground level and supported at a plurality of substantially linearly aligned points. Such apparatus, however, would be of only limited value except when erected on quite extensive tracts of land, due to the inability of the wire travelling devices thereof to readily pass a wire support point when the adjoining sections of the wire are not in substantially linear alignment. The animal tethering apparatus forming the subject matter of the instant invention, however, is considered to overcome the hereinbefore mentioned drawbacks of the prior art and to provide advantages not attainable therewith in that animals tethered thereto are provided with considerable freedom of movement even on relatively small parcels of property. IT will also be obvious that young children could be tethered to such apparatus to permit responsible adults to exercise something less than constant vigilance over them without endangering their persons.

Although, as set forth hereinbefore, the apparatus forming the subject matter of the instant invention has been found to be quite advantageous when utilized as contemplated for tethering animals or young children, effective use thereof is by no means limited thereto. Along these lines, it will be apparent that a system incorporating apparatus of the type disclosed herein could be installed, for example, in factory of warehouse buildings, and that objects suspended from the device thereof moveable along the overhead line or the like thereof, which in such a case would preferably be a cylindrical pipe or rod, could be manually moved with minimum effort from one point to another along a path having horizontally angularly disposed sections.

It will also be apparent that at least one embodiment of the device moveable along the overhead line according to the present invention, moreover, could be suitably mounted in a fixed position, if desired, and a flexible line having flexible elements projecting therefrom at intervals in a direction more or less perpendicular to the linear axis thereof could be passed through at least this embodiment of the device. Such an arrangement of the apparatus would be well suited to the requirements, for example, of seagoing fisherman, who may mount this embodiment of the device wherever desired on a railing or the like of their vessels, and pass therethrough deep sea lines of great length having hooks flexibly interconnected therewith at spaced intervals.

It will further be obvious that at least one embodiment of the device moveable along the overhead line according to the instant invention would be useable in suspending curtains or the like therefrom when it is desired to hang such items to be moved along a curved curtain rod mounted adjacent the upper extremity of a curved wall or the like. The curved curtain rod, although relatively rigidly formed, could conform in cross section to the hereinbefore mentioned overhead line, and could be interconnected with the wall by means of horizontally extending bracket elements projecting therefrom at spaced intervals. A plurality of such devices moveable along the overhead line according to the present invention, obviously, would be mounted on the curved rod and would be connected to the upper extremity of the curtains or the like at spaced intervals.

Accordingly, an object of the present invention is the provision of apparatus including a device relatively moveable with respect to a line or the like interengageable therewith having elements angularly projecting therefrom at spaced intervals.

Another object of the instant invention is the provision of apparatus including a device to which animate or inanimate objects may be secured and which is adapted freely move along the entire length of a substantially horizontally disposed wire or the like having a plurality of angularly related sections supported a distance above ground level at a plurality of points.

A further object of the present invention is the provision of animal tethering apparatus affording a tethered animal considerable freedom of movement over a relatively limited area.

Still another object of the instant invention is the provision of animal tethering apparatus including a device to which an animal may be tethered and which is adapted to freely move along the entire length of a wire or the like having a plurality of angularly related sections supported substantially horizontally a distance above ground level at a plurality of points.

Yet another object of the present invention is the provision of apparatus including a plurality of devices moveably mounted on a curved curtain rod or the like useable for suspending curtains and the like adjacent a curved wall surface or the like.

According to the instant invention, the foregoing and other objects are generally obtained by providing apparatus including a line or the like supported a distance above ground or floor level at a plurality of points and having two or more substantially horizontally angularly disposed sections, as well as a device freely moveable along the length thereof past the support points thereof to which animals or manually manipulatable inanimate objects may be secured. One embodiment of the device moveable along the line or the like includes a substantially tubular shuttle element having a downwardly depending pad eye member rigidly connected thereto about the longitudinal midpoint of the substantially cylindrical wall thereof; and provided with a longitudinal slot extending along and completely through the entire length of the cylindrical wall thereof situated radially at about an angle of 90° with respect to the pad eye member. The substantially planar end surfaces of the tubular shuttle element are each disposed at an acute angle with respect to the longitudinal centerline thereof and in operationally substantially vertical converging planes; the shortest length of the substantially cylindrical wall of the tubular shuttle element so formed being the location of the longitudinal slot hereinbefore mentioned, which may be either straight or of a sinuous nature. Another embodiment of the device moveable along the line or the like includes an operationally substantially vertically disposed plate element having a pair of upper rollers and a pair of lower rollers connected to one of the planar surfaces thereof; the upper pair of rollers being adapted to somewhat embrace the upper surface of the line or the like and to be rolled therealong. The lower pair of rollers are simultaneously positionable beneath the line or the like; elongated element means supporting the line or the like at least at certain of the support points thereof projecting substantially horizontally away from the side thereof remote from the plate element and presenting no obstacle to the movement of the device along the line or the like. A rowel is mounted on a member projecting from the plate element of the device between the upper rollers thereof a distance somewhat greater than the width of the rollers; the length of the spokes of this rowel being sufficient to project between the upper and lower rollers of the device and serve to keep it from inadvertently leaving the line or the like. As the device approaches a support element for the line or the like, adjacent spokes of the rowel embrace the support element, and as the device further moves along the line or the like, pressure of the support element against one of these spokes causes rotation of the rowel, permitting relative movement of the rollers and the support element. When the device has passed the support element, these adjacent spokes move with the device and are thereby disengaged from the support element.

A more complete appreciation of the invention and many of the attendant advantages thereof will be readily apparent as the same becomes better understood by reference to the following detailed description when considered in like, with the accompanying drawings wherein:

FIG. 1 is an end elevational view of a first embodiment of the device according to the instant moveable along a substantially horizontally disposed line or the like supported a distance above ground level also showing in section a portion of the support means for the line or the like;

FIG. 2 is a front elevational view of the first embodiment of the device moveable along the line or the like;

FIG. 3 is a plan view of the first embodiment of the device moveable along the line or the like;

FIG. 4 is a fragmentary, front elevational view of a second embodiment of the device moveable along the line or the like similar to the first embodiment of the device shown in FIGS. 1–3 but provided with a modified longitudinal slot arrangement, FIG. 5 is a fragmentary plan view of the horizontally disposed line or the like and one of the support elements therefor situated adjacent the point of intersection of two of the angularly related sections thereof also showing the device of FIGS. 1–3 moveably interengaged with the line or the like;

FIG. 6 is a plan view of another support element for the line or the like useable in lieu of the support element shown in FIG. 5 with the device of FIGS. 1–3;

FIG. 7 is a side elevational view of a terminus of the line or the like;

FIG. 8 is a side elevational view of the apparatus according to the instant invention; the view of the device of FIGS. 1–3 shown therein being taken along the line 8—8 of FIG. 5;

FIG. 9 is a plan view illustrating, by way of exemplification, one layout for the apparatus according to the present invention;

FIG. 10 is a plan view illustrating another exemplary layout for the apparatus according to the instant invention;

FIG. 11 is a front elevational view of a third embodiment of the device according to the present invention moveable along a substantially horizontally disposed line or the like supported a distance above ground level;

FIG. 12 is a sectional, elevational view of the device shown in FIG. 11, taken along the line 12—12 of FIG. 11;

FIG. 13 is a somewhat schematic and fragmentary perspective view of the third embodiment of the device according to the instant invention interengaged with the horizontally disposed line or the like in a position to pass one of the support elements therefor; and FIG. 14 is a fragmentary plan view of the horizontally disposed line or the like and support elements therefor useable with the device of FIGS. 11–13 situated adjacent the point of intersection of two of the angularly related sections thereof.

Referring now more particularly to the drawings, wherein like reference numerals designate the same or identical parts throughout the several views, and more specifically to FIGS. 1–3, there is shown a first embodiment of a device moveable along an overhead line having a plurality of substantially horizontally disposed, angularly related sections. This first embodiment of the device moveable along such a line may aptly be referred to as a shuttle, and is generally designated by the reference numeral 21. Shuttle 21 includes a substantially tubular body element body element 22 having an elongated and substantially cylindrical wall provided with a longitudinal slot 23 having rounded edges extending completely therethrough and therealong. The substantially planar end surfaces 24 of the body element 22 of shuttle 21 are each disposed at an acute angle with respect to the longitudinal centerline thereof and in operationally substantially vertically disposed converging planes; the shortest length of the substantially cylindrical wall of the body element 22 of shuttle 21 so formed being the location of the longitudinal slot 23 thereof. Further, the tip portion 25 of each of the end surfaces 24 of body element 22 of shuttle 21 most remote from the slot 23 thereof is bent somewhat away from the slot 23, as by hammering or the like. The shuttle 21 is also provided with a downwardly depending pad eye member 26 rigidly exteriorly connected, as by welding or the like as shown by the weld beading 27, to the tubular body element 22 of shuttle 21 at about the longitudinal midpoint of the substantially cylindrical wall thereof; pad eye member 26 being radially situated at about an angle 90° with respect to the longitudinal slot 23 formed in the wall of tubular body element 22 of shuttle 21. Pad eye member 26 is also provided with a bore 28 extending therethrough.

Turning now to FIG. 4 of the drawings, there is fragmentarily shown a second embodiment of a device moveable along an overhead line having a plurality of horizontally disposed, angularly related sections. The device shown in FIG. 4, which may also aptly be referred to as a shuttle and is generally designated by the reference numeral 29, is substantially similar to the shuttle 21; differing therefrom only in that the substantially cylindrical wall of the substantial tubular body element 31 of shuttle 29 is the substantially with a longitudinal slot 32 having a sinuous configuration. The slot 32, as shown in FIG. 4, also has rounded edges and the longitudinal shape thereof approximates the form of a single, complete sine wave. The shape of the shuttle slot shown in FIG. 4 permits the use of a line or the like upon which the shuttle travels smaller in diameter than would otherwise be permissible.

Referring now more specifically to FIG. 1, as well as to FIG. 5, there is shown a portion of an overhead line 33 along which the shuttles 21 or 29 may move, as well as one of the support elements therefor, which is generally designated by the reference numeral 34. Support element 34 includes a substantially tubular body element 35 having a substantially cylindrical outer surface smaller in diameter than the inside diameter of the body element 22 of shuttle 21 and of the body element 31 of shuttle 29. The body element 35 is formed by rolling a substantially rectangularly shaped piece of sheet metal of fairly heavy gauge around a portion of the line 33 to substantially completely enclose the same; the line 33 preferably being thereby tightly clamped by the body element 35 of support element 34. The support element 34 further includes a plurality of tab sections 36 projecting outwardly from one of the edges of the body element 35 thereof extending contiguously to and along the line 33; tab sections 36 being preferably formed integrally with body element 35 of support element 34 and being disposed in a mutually substantially coplanar relation. The thickness of each tab section 36 of support element 34 is less than the width of the longitudinal slot formed in the shuttle 21 or the shuttle 29, and each of these tab sections 36 is provided with a bore extending operationally substantially vertically therethrough. One tab section 36 is disposed adjacent each of the ends of the body element 35 of support element 34, and another tab section 36 is disposed at about the longitudinal midpoint thereof. Further, the body element 35 of support element 34 is curved substantially in the plane occupied by the tab sections 36 thereof in the direction away from the tab sections 36; the degree of curvature of the body element 35 of support element 34 being made sufficient to effect a smooth transition between two adjacent and horizontally angularly related segments of the line 33. The sheet metal of which the body element 35 of support element 34 is formed is preferably sufficiently ductile to readily permit the bending thereof into the desired curved shape by the user of the apparatus forming the subject matter of the present invention.

When a shuttle 21, as shown in FIG. 5, or a shuttle 29 moves along a segment of the line 33 towards a support element 34, the pad eye member 26 may not be in a substantially vertical plane, inasmuch as an animal tethered to a chain or the like connected to pad eye member 26 may be pulling thereon in a direction somewhat transverse to the longitudinal axis of this segment of line 33, and consequently the longitudinal slot 23 of the shuttle 21 or the end of the sinuous longitudinal slot 32 of the shuttle 29 would not be in planar alignment with the tab sections 36 of the support element 34. However, as the so canted shuttle 21 or the so canted shuttle 29 begins to pass over the tubular body element 35 of support element 34 the leading end surface 24 thereof would first contact the adjacent tab section 36 of support element 34 at a point somewhat remote from the longitudinal slot formed in the tubular body element of the shuttle and, due to the disposition of the end surface 24 of the shuttle body element at the acute angle hereinbefore set forth with respect to the longitudinal centerline thereof, as the shuttle further passes over the body element of support element 34 the point of contact between the leading end surface 24 of the shuttle and the adjacent tab section 36 of the support element 34 would move towards the longitudinal slot formed in the tubular body element of the shuttle, thereby smoothly rotating the shuttle element into the position best seen in FIG. 1 to readily permit it to pass the tab sections 36 of the support element 34.

It will be noted that the bending of the tip portion 25 of each end surface 24 of the tubular body element of the shuttles hereinbefore described would eliminate the possibility that the shuttles would catch against the ends of the tubular body element 35 of support element 34, and further would increase the clearance between the shuttle and the curved body element 35 of support element 34 as the shuttle passes over the support element 34. At this point, also, it should be noted, that, if the shuttle 29 is used, the spacing between the tab sections 36 of the support element 34 should be at least equal to the distance between the ends of the sinuous longitudinal slot 32 formed in the tubular body element 31 of the shuttle 29, and further that the tab section 36 of the support element 34 should be so proportional in width and thickness, at least in the vicinity of the body element 35 thereof, as to enable the sinuous slot 32 formed in the body element 31 of shuttle 29 to readily pass thereover.

Although the support element 34 shown in FIG. 5 is preferred when the shuttle 21 or the shuttle 29 is utilized in the apparatus forming the subject matter of the present invention, other support elements may also be provided. Accordingly, another support element of this type, generally designated by the reference numeral 37, is illustrated in FIG. 6 of the drawings. Support element 37 also includes a tubular body element 38 corresponding to the body element 35 of support element 34 and used similarly thereto. Rather than being provided with a plurality of tab sections similar to the tab sections 36 of support element 34, however, support element 37 instead is provided with a sheet metal tie section 39 having a curved inner edge conforming to the curve of the body element 38 of support element 37; the tie section 39 being suitable for connection, as by welding, along the curved inner edge thereof to the conformingly curved body element 38 of support element 37, to which it is welded or otherwise suitably connected. Several spaced bores are operationally vertically formed through the tie section 39 of support element 37 corresponding in disposition and function to the bores formed through the tab sections 36 of support element 34, taken collectively, for the purpose more fully set forth hereinafter. It will be apparent, at this point, that use of the support element 37 would generally not be preferred over use of the support element 34, inasmuch as a shuttle 29 obviously could not be used therewith, and further because the user could not bend the support element 37 to curve the same to meet his particular requirements, as he would be able to do when the support element 34 is utilized. Nevertheless, Nevertheless, support elements 37 could still be manufactured and sold with varying degrees of curvature, and the buyer would be able to select from such a variety of support elements 37 those that appeared to meet most closely his special needs. Also, the support element could alternatively be manufactured in a substantially full 360° circular form, and the user could cut therefrom, as by sawing, portions of the proper size to give him the desired change of direction at each support point for his overhead line or the like.

When the line 33 or the like terminates at spaced points, means are preferably provided adjacent each terminus thereof to prevent the shuttle 21 or the shuttle 29 travelling therealong under the impetus of a rapidly moving animal from stopping abruptly at such line termini, in the interest of reducing the shock that such an animal would thereby experience. Such means, as shown in FIG. 7, could simply include a pair of suitably shaped elements 41 moveably strung upon line 33 adjacent each terminus thereof and having an elongated helical compression spring 42 connected therebetween and also encircling the line 33. When a shuttle 21 or 29 collides with the element 41 most remote from the terminus of line 33, this element 41 will move along line 33 together with the shuttle 21 or 29, thereby compressing the spring 42 and relatively gradually slowing down the movement of the shuttle to attain the results hereinbefore set forth. Although the means shown in FIG. 7 of the drawings would generally be adequate for such purposes, it may also be found desirable to maintain the element 41 nearest a terminus of line 33 at a preselected distance therefrom, which could be accomplished by moving the elements 41 and the spring 42 further away from the terminus of line 33 than shown in FIG. 7 and then by placing a knot or the like in the line 33 between the terminus thereof and the adjacent element 41 over which the elements 41 could not pass. In such a case, the distance at which the element 41 nearest the terminus of line 33 is maintained therefrom should be sufficient to prevent an animal, at full extension of the leash or the like by which he is attached to the shuttle moveable along the line 33, from inadvertently running into the support for the terminus of line 33.

When apparatus according to the instant invention is erected, a support element such as the support element 34 interconnected with line 33 as hereinbefore set forth would be interconnected with a vertically disposed support such as a post, a tree trunk, or a building wall at a distance ground level. A support line 43 attached to each tab section 36 of support element 34 by means of the bore formed therethrough would extend in converging relation with the other of such lines 43 towards the post or the like for interconnection therewith; each support line 43 being kept taut in order to assure that the support element 34 in the erected apparatus would be disposed substantially in the attitude shown in the drawings. At least one such support element 34 included in the apparatus, rather than being connected directly to the post or the like by means of the support lines 43, would instead, as illustrated in FIG. 8 of the drawings, be so interconnected with the post or the like as to maintain line 33 in a substantially taut condition. In FIG. 8, the line 33, shuttle 21, support element 34, and support lines 43 are shown in side elevation as they would appear when these components, which are shown in FIG. 5, are viewed along the line 8—8 of FIG. 5. Further, in FIG. 8, the taut support lines 43, at their point of convergence, are connected to another line 44, which extends substantially horizontally towards a pulley wheel 45 disposed in a substantially vertical plane and interconnected by means of a suitable pulley bracket 46 to the vertically disposed support post 47. The line 44 passes over the pulley wheel 45 and thence downwardly substantially parallelly to the support post 47. A plurality of weights 48 are carried by the segment of line 44 extending parallelly to post 47 and are supported thereby a distance above ground level; the tensile force established in line 44 by the weights 48 acting to draw the support element 34 shown in FIG. 8 towards the post 47 with the result that the tensile force thereby established in the line 33 serves to maintain the same in a reasonably taut condition throughout its entire length. The line 33 would thereby be prevented from sagging to the point where it might interfere with the movements of the animal tethered by means of the chain 49 or the like to the shuttle mounted to travel along the line 33 as set forth hereinbefore.

When the apparatus according to the present invention is utilized for the tethering of a domestic animal such as a dog belonging to the owner of a dwelling situated in fairly extensive grounds, the line 33 thereof may be arranged in a closed circuit, as shown, by way of example, in FIG. 9 in plan view. The building 51 may be utilized to support one of the support elements 34 in turn helping to support the line 33. One of the support elements 34 shown in FIg. 9 is disposed in proximity to the pulley bracket 46 shown connected to a post or tree, this support bracket 46 and the pulley 45 connected thereto is used in drawing this support element 34 towards the post or tree carrying the pulley bracket 46 to tauten line 33 in the manner described hereinbefore. It will be obvious that, when line 33 is arranged in a closed circuit as shown in FIG. 9, the two ends thereof may be introduced from opposite directions into the tubular body element 35 of a support element 34, which, when clamped therearound, would serve to connect the two ends of line 33 together in lieu of a splice or the like.

At this point, it is considered appropriate to mention that the body element 35 of support element 34 need not be tightly clamped around the line 33, as hereinbefore set forth. Such a support element could alternatively include a length of curved pipe having an inside diameter slightly larger than the outside diameter of line 33 forming the body element thereof corresponding to the body element 35 forming the support element 34, to which tab sections corresponding to the tab sections 36 of support element 34 could be welded. Then, when the line 33 is arranged in a closed circuit, as shown in FIG. 9, the two ends thereof could be introduced from opposite directions into the pipe forming the body element of such a support element. Set screws suitably positioned on the pipe forming the body element of such a support element and extending through the cylindrical wall thereof in conformingly tapped holes could then be turned down into contact with the end portions of line 33 to secure the same within such a body element of the support element; care being exercised to assure that no portion of these set screws extends beyond the cylindrical outer surface of such a body element of the support element which would interfere with the passage of a shuttle thereover.

FIG. 10, in plan view, shows another arrangement for the erection of apparatus according to the instant invention when utilized for tethering a domestic animal belonging to the occupant of a dwelling situated in less extensive grounds than that shown in FIG. 9. In this example of the erection of the apparatus, the line 33 is not disposed in a closed circuit, but is instead arranged in several segments extending around the side walls and the rear wall of the building 52 shown in FIG. 10. One of the support elements 34 for the line 33 shown in FIG. 10 is drawn towards the support post or tree carrying the pulley bracket 46 for the purpose of keeping the lines 33 substantially taut similarly to the tautening of the line 33 shown in FIG. 9 as hereinbefore discussed.

Referring now more particularly to FIGS. 11-13 of the drawings there is shown a third embodiment of the device moveable along an overhead line having a plurality of substantially horizontally disposed, angularly related sections. This third embodiment of the device moveable along such a line likewise may aptly be referred to as a shuttle, and is generally designated by the reference numeral 53. Shuttle 53 includes an operationally substantially vertically disposed plate element 54 which in frontal elevation, as shown in FIG. 11, has a relatively large substantially circular upper area 55 and, formed integrally therewith, a relatively small substantially triangular lower area 56 coming substantially to an apex at the lower extremity of plate element 54. The plate element 54 of shuttle 53, along the two substantially circular side edges of the upper area 55 thereof, is also provided with a pair of ear portions 57 which, along about the upper four-fifths of the lengths thereof, are beveled from the inner edge thereof situated on the front surface of plate element 54 towards the outer edge thereof situated on the rear surface of plate element 54. Further, each ear portion of plate element 54, adjacent the unbeveled lower extremity thereof, is provided with a relatively small opening 58 bored therethrough. A link element 59 is engaged with the bore 58 formed through each ear portion 57 of plate element 54, and a fairly heavy and compact weight 61 is suspended from each of the link elements 59. Each weight 61 may be, for example, a sizeable lead fishline sinker, and these weights 61 held in stabilizing the plate element 54 of shuttle 53 in the substantially vertical operational position thereof, as more fully set forth hereinafter. Also, a relatively large bore 62 is formed through the lower area 56 of place element 54 which corresponds functionally to the bore 28 formed through the pad eye member 26 of shuttles 21 and 29, and which engages a depending chain 49 or the like; only a portion of the upper link thereof being shown in FIGS. 11 and 12. The portion of the lower area 56 of plate element 54 of shuttle 53 extending downwardly from about the midpoint of the bore 62 formed therethrough may be bent somewhat forwardly, as clearly shown in FIG. 12, which may further help in stabilizing the plate element 54 of shuttle 53 in the substantially vertical operational position thereof, as hereinafter more fully set forth.

Shuttle 53 also includes a pair of upper rollers 63 and a pair of lower rollers 64 connected to the planar front surface of the upper area 55 of plate element 54. Rollers 63 and rollers 64 are all preferably identical, and the diameter of each of the rollers 63 and 64 may be equal to about one-fourth of the diameter of the substantially circular upper area 55 of the plate element 54. The upper rollers 63 are centered at about three-tenths of the vertical distance between the upper and lower extremities of plate element 54 and are symmetrically disposed with respect to the frontal vertical centerline thereof; the upper rollers 63 being laterally spaced a distance equal to about the diameter of one of these rollers. The lower rollers 64 are centered at about six-tenths of the vertical distance between the upper and lower extremities of plate element 54 and are also symmetrically disposed with respect to the frontal vertical centerline thereof; the lower rollers 64 being laterally space only a slight distance apart. The vertical spacing between the pair of upper rollers 63 and the pair of lower rollers 64 is somewhat greater than the diameter of the horizontally disposed line or the like along which the shuttle 53 may move. The rollers 63 and 64 may be formed of a suitable metallic substance such as aluminum or of a suitable nonmetallic substance such as nylon, and in thickness are somewhat greater than the diameter of the line or the like along which the shuttle 53 is to travel. The circular face of the rollers 63 and 64 between the front and rear parallelly disposed surfaces thereof is made somewhat concave, as indicated at 65 in FIG. 12, to better conform to the circular cross section of the line or the like upon which the shuttle 53 will move.

A countersunk bore is centrally formed through each of the rollers 63 and 64, and a flat headed machine screw 66 is passed through this bore formed in each roller 63 and 64; the head of each screw 66 being substantially flush with the front surface of a roller 63 and 64. Each screw 66 is then passed through a suitable washer 67 placed between a roller and the front surface of the plate element 54 as well as through a bore formed through the plate element 54, and is then threaded into a nut 68 disposed adjacent the rear surface of plate element 54. Preferably, each of the nuts 68 is permanently interconnected in the proper position with the rear surface of the plate element 54 as by welding, as indicated in FIG. 12 by the weld beads 69, or by other suitable means.

The shuttle 53 further includes a rowel, generally designated by the reference numeral 71, having a substantially circular planar central section 72 and a plurality of spokes 73 projecting outwardly at regular radial intervals from the central section 72 thereof. The spokes 73 each have somewhat convexly curved side edges, which are chamfered, as indicated at 74 in FIG. 11, along the fronts thereof. The side edges of the spokes 73 of rowel 71 are also similarly chamfered along the rear thereof. Further, the tips of each of the spokes 73 of rowel 71 are curved somewhat forwardly, as indicated at 75 in FIGs. 11 and 12.

The rowel 71 is axially mounted on a cylindrical member 76 formed of a suitable nonmetallic substance such as nylon projecting from the front surface of the plate element 54 of shuttle 53 centrally between the upper pair of rollers 63. The length of the member 76 is slightly greater than the distance between the front surface of the plate element 54 and the front surfaces of the rollers 63 and 64 mounted as hereinbefore described. The cylindrical member 76 is vertically so positioned adjacent the front surface of plate element 54 that the central section 72 of rowel 71 is situated completely and somewhat substantially above the lower extremities of the upper rollers 63; the length of the spokes 73 of rowel 71 when mounted in the position described being sufficient to project between the upper rollers 63 and the lower rollers 64 of shuttle 53. The mounting of rowel 71 as hereinbefore set forth is accomplished by passing a headed bolt 77 or the like through a suitable washer 78, then through a bore centrally formed through the section 72 of rowel 71, then through a bore axially formed through the cylindrical member 76, and finally through a bore formed through plate element 54; the length of bolt 77 being sufficient to then turn a nut 79 down on a threaded portion thereof projecting beyond the rear surface of plate element 54.

The shuttle 53 is adapted to move along an overhead line 81 or the like, as somewhat schematically shown in FIG. 13, functionally similar to the line 33 hereinbefore described; the line 81 being supported at intervals by support elements, generally designated by the reference numeral 82, functionally similar to the support elements 34 and 37 hereinbefore set forth. Support element 82 includes a tubular body element 83 which may be formed of a suitably ductile sheet metal tightly clamped about the line 81 similarly to the connection of the body element 35 of support element 34 to the line 33. Support element 82 further includes several preferably somewhat flexible support clews or lines 84 projecting laterally from a side of the body element 83 thereof at spaced intervals and in substantially coplanar relation.

The shuttle 53 is mounted on the line 81 with the lower extremities of the upper pair of rollers 63 thereof somewhat embracing the upper portion of the line 81. The lower pair of rollers 64 of the shuttle 53 are simultaneously positioned beneath the line 81 and somewhat spaced therefrom. Certain of the spokes 73 of the rowel 71 of the shuttle 53 project downwardly between the front surfaces of the upper rollers 63 and the lower rollers 64 and serve to keep the shuttle 53 from inadvertently leaving the line 81 as it moves therealong with the upper rollers 63 thereof in rolling contact with the upper extremity of the line. As the shuttle 53 approaches the support element 82 the beveled edge of the leading ear portion of the plate element 54 serves to prevent the shuttle 53 from hanging up on the adjacent end of the tubular body element 83 of the support element 82, and the upper rollers 63 of shuttle 53 would then readily roll onto the body element 83 of support element 82. Adjacent spokes 73 of the rowel 71 would then embrace the first support clew or line 84 of support element 82 as the shuttle 53 moves thereover, as indicated in FIG. 13, the chamfered edges and the forwardly bent tip of each spoke 73 serving to prevent the spokes 73 from hanging up against the support clew or line 84, and the pressure of this first support line 84 against one of these spokes 73 causes rotation of the rowel 71, permitting the shuttle 53 to move along the support element 82. When the shuttle 53 has passed the first support line 84 of support element 82, these adjacent spokes 73 of rowel 71 move along with the shuttle 53 and are thereby disengaged from the first support line 84 of support element 82. The shuttle 53 similarly passes the remaining support lines 84 of support element 82, and then passes off of the tubular body element 83 thereof and back onto the line 81.

The necessity of maintaining the plate element 54 of shuttle 53 in a substantially vertical operating attitude will now be clearly apparent. As mentioned hereinbefore, the provision of the weights 61 suspended from the plate element 54 of shuttle 53 may be found to be of material assistance in the attainment of this objective. Further, as also hereinbefore set forth, the bending at the location of bore 62 of the lower area 56 of the plate element 54 of shuttle 53, by bringing the weight suspended from the shuttle 53 more nearly beneath the rollers 63 thereof, would obviously be of great import in stabilizing the shuttle 53 in this necessary attitude.

The preferred connection of the support element 82 for the line 81 to a vertically disposed support post or the like at a suitable distance above floor or ground level is illustrated in FIG. 14 of the drawings, wherein the outwardly diverging and taut support lines 84 connected to the inwardly curving tubular body element 83 of support element 82 are also connected at spaced intervals to an elongated spreader member 85. Other lines 86 also connected to spreader member 85 in turn are utilized in connecting the same directly to the support post 87 or the like, or alternatively to a line tensioning system, not illustrated, similar to that shown in FIG. 8.

It will also be obvious that the shuttle 29 shown in FIG. 4 of the drawings could be utilized with the line 81 and support element 82 shown in FIGS. 13 and 14 in lieu of the shuttle 53, if desired.

The shuttle 53 moveable along the line 81, due to the rugged construction thereof and due to the fact that it moves along the line 81 on the rollers 63, would probably be preferred in most of the instances where installation of the apparatus according to the present invention would be made in a factory building, warehouse, or the like for the moving of relatively heavy loads suspended from the shuttle 53 mounted on the line 81 or the like. In such instances, also, the line 81 or the like would preferably be formed of rigid components such as metal pipe or rod elements rather than a flexible cable.

Obviously, many modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. Apparatus of the character described, comprising:
   a substantially horizontally disposed line or the like having a plurality of sections;
   means for partially supporting said line or the like a distance above floor or ground level situated adjacent the junction of two adjoining sections of said line or the like including at least one element interconnected with said line or the like and extending substantially horizontally therefrom for interconnection with a fixed object extending upwardly from said floor or ground level, said line or the like having at least a greater vertical dimensions than said element interconnected therewith and extending substantially horizontally therefrom; and a shuttle moveable along one of said two adjoining sections of said line or the like past said means for partially supporting said line or the like and thence along the other of said two adjoining sections of said line or the like, said shuttle including a substantially tubular body element operationally substantially embracing said line or the like having a substantially cylindrical wall provided with a substantially straight longitudinal slot extending completely therethrough and therealong, the width of said longitudinal slot being smaller than the vertical dimension of said line or the like and greater than the vertical dimension of said element interconnected with said line or the like and extending substantially horizontally therefrom, said body element of said shuttle having end surfaces disposed at an acute angle with respect to the longitudinal centerline of said body element in operationally vertical converging planes, the shortest length of said substantially cylindrical wall of said body element so formed being the location of said longitudinal slot provided therein, said longitudinal slot provided in said substantially cylindrical wall of said body element operationally receiving therein said element interconnected with said line or the like and extending substantially horizontally therefrom when said shuttle passes the same, said shuttle further including operationally substantially downwardly depending means to which animate or inanimate objects may be secured externally connected thereto at about the longitudinal mid-point thereof and radially disposed at about an angle of 90° with respect to said longitudinal slot provided in said wall of said body element.

2. Apparatus according to claim 1, wherein the tip portion of each of said end surfaces of said tubular body element of said shuttle most remote from said longitudinal slot provided therein is bent away from said longitudinal slot.

3. Apparatus of the character described, comprising:
a substantially horizontally disposed line or the like having a plurality of sections;
means for partially supporting said line or the like a distance above floor or ground level situated adjacent the junction of two adjoining sections of said line or the like including at least one element interconnected with said line or the like and extending substantially horizontally therefrom for interconnection with a fixed object extending upwardly from said floor or ground level; and
a shuttle moveable along one of said two adjoining sections of said line or the like past said means for partially supporting said line or the like and thence along the other of said two adjoining sections of said line or the like, said shuttle including a substantially tubular body element operationally substantially embracing said line or the like having a substantially cylindrical wall provided with a sinuous longitudinal slot extending completely therethrough and therealong, the width of said sinuous longitudinal slot being greater than the vertical dimension of said element interconnected with said line or the like and extending substantially horizontally therefrom, said body element of said shuttle having end surfaces disposed at an acute angle with respect to the longitudinal centerline of said body element in operationally substantially vertical converging planes, the shortest length of said substantially cylindrical wall of said body element so formed being the location of said sinuous longitudinal slot provided therein, said sinuous longitudinal slot provided in said substantially cylindrical wall of said body element operationally receiving therein said element interconnected with said line or the like and extending substantially horizontally therefrom when said shuttle passes the same, said shuttle further including operationally substantially downwardly depending means to which animate or inanimate objects may be secured externally connected to said body element at about the longitudinal mid-point thereof and radially disposed at about an angle of 90° with respect to said sinuous longitudinal slot provided in said substantially cylindrical wall of said body element.

4. Apparatus according to claim 3, wherein the tip portion of each of said end surfaces of said tubular body element of said shuttle most remote from said sinuous longitudinal slot provided therein is bent away from said sinuous longitudinal slot.

5. Apparatus of the character described, comprising:
a substantially horizontally disposed line or the like having a plurality of sections;
means for partially supporting said line or the like a distance above floor or ground level situated adjacent the junction of two adjoining sections of said line or the like including at least one element interconnected with said line or the like and extending substantially horizontally therefrom for interconnection with a fixed object extending upwardly from said floor or ground level; and
a shuttle moveable along one of said two adjoining sections of said line or the like past said means for partially supporting said line or the like and thence along the other of said two adjoining sections of said line or the like, said shuttle including an operationally substantially vertically disposed plate element having an upper area provided with a substantially planar front surface operationally disposed closely adjacent the side of a length of said line or the like opposite the side thereof from which said element interconnected with said line or the like substantially horizontally extends, a pair of laterally spaced upper rollers rotatably connected to said front surface of said upper area of said plate element operationally positioned upon said length of said line or the like and adapted to roll thereupon as said shuttle moves along said line or the like, a pair of laterally spaced lower rollers rotatably connected to said front surface of said upper area of said plate element operationally positioned beneath said length of said line or the like, and a rowel rotatably mounted on a member projecting forwardly from said front surface of said upper area of said plate element between said pair of upper rollers somewhat above the lower extremities thereof a distance slightly greater than the distance between said front surface of said upper area of said plate element and the front surfaces of said rollers, said rowel having a substantially circular planar central section positioned above the lower extremities of said pair of upper rollers and having a plurality of radially spaced spokes projecting outwardly from said central section thereof sufficient in length to extend between said pair of upper rollers and said pair of lower rollers to thereby partially embrace said length of said line or the like, said rowel rotating to permit said shuttle to pass said element interconnected with said line or the like and extending substantially horizontally outwardly therefrom, said plate element further including a lower area defining operationally substantially downwardly depending means to which animate or inanimate objects may be secured.

6. Apparatus according to claim 5, wherein said upper area of said plate element is provided with an ear portion extending along each of the side edges thereof, an upper length of each of said ear portions being beveled from the inner edge thereof situated on the front surface of said upper area of said plate element towards the outer edge thereof situated on the rear surface of said upper area of said plate element.

7. Apparatus according to claim 6, wherein a weight is suspended from a lower length of each of said ear portions of said upper area of said plate element, and wherein said lower area of said plate element is bent somewhat forwardly at about the operationally vertical mid-point of a bore formed therethrough.

8. Apparatus according to 5, wherein said spokes of said rowel are beveled along the side edges thereof adjacent the front and the rear surfaces thereof, and wherein the tips of said spokes of said rowel are bent somewhat forwardly.

9. Apparatus according to claim 8, wherein said upper area of said plate element is provided with an ear portion extending along each of the side edges thereof, an upper length of each of said ear portions being beveled from the inner edge thereof situated on the front surface of said upper area of said plate element towards the outer edge thereof situated on the rear surface of said upper area of said plate element, wherein a weight is suspended from a lower length of each of said ear portions of said upper area of said plate element, and wherein said lower area of said plate element is bent somewhat forwardly at about the operationally vertical mid-point of a bore formed therethrough.

* * * * *